US006991760B2

United States Patent
Oobayashi et al.

(10) Patent No.: US 6,991,760 B2
(45) Date of Patent: Jan. 31, 2006

(54) METHOD AND APPARATUS FOR VULCANIZING TIRE

(75) Inventors: Akio Oobayashi, Kodaira (JP); Tatsuo Matsuo, Kodaira (JP); Michihiko Nishimura, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 376 days.

(21) Appl. No.: 10/322,497

(22) Filed: Dec. 19, 2002

(65) Prior Publication Data

US 2003/0132550 A1    Jul. 17, 2003

(30) Foreign Application Priority Data

Dec. 28, 2001  (JP)  ............... 2001-401325

(51) Int. Cl.
   *B29C 35/02*   (2006.01)
   *B29D 30/00*   (2006.01)
(52) U.S. Cl. ............. 264/501; 264/236; 264/347; 264/325; 425/47; 425/52
(58) Field of Classification Search .......... 264/501, 264/236, 347, 326, 325; 425/47, 52
   See application file for complete search history.

(56) References Cited

U.S. PATENT DOCUMENTS

| 3,082,480 | A | * | 3/1963 | Balle ................ 425/46 |
| 3,730,658 | A |   | 5/1973 | Marra et al. |
| 3,989,791 | A | * | 11/1976 | Tippin ............. 264/315 |
| 4,289,463 | A |   | 9/1981 | Le Moullac et al. |
| 5,141,424 | A |   | 8/1992 | Christof et al. |
| 5,585,064 | A | * | 12/1996 | Moris-Herbeuval et al. ............. 264/501 |

FOREIGN PATENT DOCUMENTS

| EP | 0 270 021 A2 | 6/1988 |
| FR | 2 270 089 | 12/1975 |
| GB | 1176162 | 1/1970 |
| GB | 1 386 760 | 3/1975 |
| GB | 1 561 223 | 2/1980 |
| JP | A 2000-326332 | 11/2000 |

\* cited by examiner

*Primary Examiner*—Suzanne E. McDowell
(74) *Attorney, Agent, or Firm*—Oliff & Berridge, PLC

(57) ABSTRACT

A method and apparatus for vulcanizing tires are provided. An unvulcanized tire is transferred and loaded onto a lower mold member when a plurality of arcuate sector mold members aligned along the peripheral direction locate at the radially outermost positions as well as upper ends of the sector mold members incline radially outwards about their lower ends. An upper mold member moves toward the lower mold member while the sector mold members are swung about their lower ends to straightly stand the sector mold members, and the sector mold members are then synchronously displaced radially inwards, so that the unvulcanized tire is hermetically enclosed in a mold space formed by these mold members. The unvulcanized tire is vulcanized within the mold space to give a vulcanized tire. The sector mold members are synchronously displaced radially outwards, and swung such that the upper ends incline radially outwards about the lower ends while the upper mold member is moved away from the lower mold member, so as to remove the vulcanized tire out of the mold.

14 Claims, 2 Drawing Sheets

METHOD AND APPARATUS FOR VULCANIZING TIRE

BACKGROUND OF THE INVENTION

1. Field of the Invention

The present invention relates to method and apparatus for vulcanizing pneumatic tires.

2. Description of the Related Art

Conventional technology for vulcanizing tires is disclosed, for example, in JP-2000-326332A. In this instance, when a plurality of arcuate sector mold members aligned along the peripheral direction assume radially outermost positions, an unvulcanized tire is transferred and loaded onto the lower mold member and the upper mold member is moved toward the lower mold member while the sector mold members are synchronously displaced radially inwards, thereby hermetically enclosing the unvulcanized tire in a mold space formed by the upper mold member, the lower mold member and the sector mold members.

Subsequently, the unvulcanized tire is vulcanized in the mold space to give a vulcanized tire, and the sector mold members are then synchronously displaced radially outwards by the displacing means while the upper mold member is moved away from the lower mold member, so as to allow removal of the vulcanized tire out of the molds.

In the above-mentioned conventional technology, however, the tread of the pneumatic tire has a larger diameter as it approaches to the equator of the tire since the tread has a crown shape, so that the upper and lower ends of the inner periphery of the sector mold member protrude radially inwards as compared with the center. As a result, when the unvulcanized tire is carried into the sector mold, or when the vulcanized tire is carried out of the sector mold, the sector mold members have to be moved radially outwards by a sufficient amount so as to avoid the unvulcanized tire or the vulcanized tire from interfering with the protruded upper ends of the inner periphery of the sector molds. Therefore, the conventional technology requires a large sized facility and higher cost.

DISCLOSURE OF THE INVENTION

It is an object of the present invention to provide a method and an apparatus, capable of vulcanizing tires with a small sized facility and at low cost.

The present invention in its first aspect provides a method for vulcanizing a tire, comprising the steps of: transferring and loading an unvulcanized tire onto a lower mold member when a plurality of arcuate sector mold members aligned along the peripheral direction locate at the radially outermost positions as well as upper ends of the sector mold members incline radially outwards about their lower ends; moving an upper mold member toward a lower mold member while swinging the sector mold members about their lower ends to straightly stand the sector mold members, and then synchronously displacing the sector mold members radially inwards, so that the unvulcanized tire is hermetically enclosed in a mold space formed by the lower mold member, the upper mold member and the sector mold members; vulcanizing the unvulcanized tire with the upper mold member, the lower mold member, and the sector mold members to give a vulcanized tire; synchronously displacing the sector mold members radially outwards, and then swinging the sector mold members such that the upper ends incline radially outwards about the lower ends while moving the upper mold member away from the lower mold member; and carrying the vulcanized tire out of the mold.

The present invention in its second aspect provides an apparatus for vulcanizing a tire, comprising: a lower mold member for loading a transferred unvulcanized tire; an upper mold member being capable of moving toward/away from the lower mold member; a plurality of arcuate sector mold members aligned along the peripheral direction and being swingable in the radial direction about the lower ends; means for synchronously displacing the sector mold members radially in the radial direction; and means for swinging the sector mold members about the lower ends when these sector mold members locate at the radially outermost positions, wherein the upper mold member is movable toward the lower mold member while the sector mold members in an upright state are synchronously movable radially inwards by the displacing means so that the unvulcanized tire is hermetically enclosed in a mold space formed by these molds, and is vulcanized to give a vulcanized tire, the sector mold members are synchronously movable radially outwards by the displacing means, and are swingable by the swinging means such that the upper ends incline radially outwards about the lower ends, and the upper mold member is movable away from the lower mold member, so as to allow removal of the vulcanized tire out of the mold.

According to the present invention, the upper and lower ends of the inner periphery of the sector mold member protrude radially inwards as compared with the center, as mentioned above. However, the sector mold members are swung so as the upper ends to move radially outwards about the lower ends and are inclined so as the upper ends to open upwardly when the unvulcanized tire is carried in the mold, or when the vulcanized tire is carried out the mold, according to the present invention. Thus, even if the radially inward distance of the sector mold member moved by the displacing means is small, the unvulcanized tire or the vulcanized tire can be carried in/out the mold while avoiding the tire from interfering with the protruded upper ends of the inner periphery of the sector molds. Owing to this, the entire apparatus can be smaller in size and lower in cost.

Preferably, the displacing means is composed of an outer ring having an inclined face at its inner periphery and a displacing mechanism for displacing the sector mold members radially inwards by lowering the outer ring, the inclined face contacting outer peripheries of the sector mold members, and the apparatus further comprises means for fastening the outer ring having been lowered to the lowermost position on a fixing section of the apparatus for vulcanizing a tire. In this instance, a radially outward displacement of the sector mold member can be strongly prevented during the vulcanization, so that an overflow of rubber between the sector mold members or the like can be strongly suppressed. Further, a bayonet is preferably used as said fastening means to readily and securely prevent a radially outward displacement of the sector mold member during the vulcanization.

Preferably, the apparatus further comprises means for releasing the outer ring from the sector mold members, and the outer ring is detachable from the sector mold members unless the sector mold members are radially displaced or the tire is vulcanized, so that, as the outer ring is usually detached from the sector mold, a replacing work of the sector mold member due to a change in a kind of the tire can be facilitated. Further, the swinging means is preferably composed of a lower platen and an elevator mechanism for moving the lower platen upwardly and downwardly, and the lower platen is attached by the lower mold member and capable of engaging with a portion radially inward to the swinging center of the sector mold members located at radially outermost positions, so that the sector mold member can be securely and readily swung with a simple configuration. Furthermore, a projection or depression is preferably formed at each of the upper end and the lower end of the inner periphery of the sector mold, a projection or a depression in a complement relation with the projection or depression is preferably formed on the outer periphery of the upper and lower mold members, and the sector mold members are preferably displaced to the radially innermost position to insert the projection in the depression, thereby preventing the upper and lower mold members from opening. In this instance, the upper and lower mold members can be prevented flow opening during the vulcanization, and thus an overflow of rubber between the sector mold members can also be prevented.

BRIEF DESCRIPTION OF THE DRAWINGS

For a better understanding of the invention, reference is made to the accompanying drawings, wherein.

DETAILED DESCRIPTION OF THE PREFERRED EMBODIMENT

An embodiment of the present invention will be discussed below with reference to the attached drawings.

Figure 1:
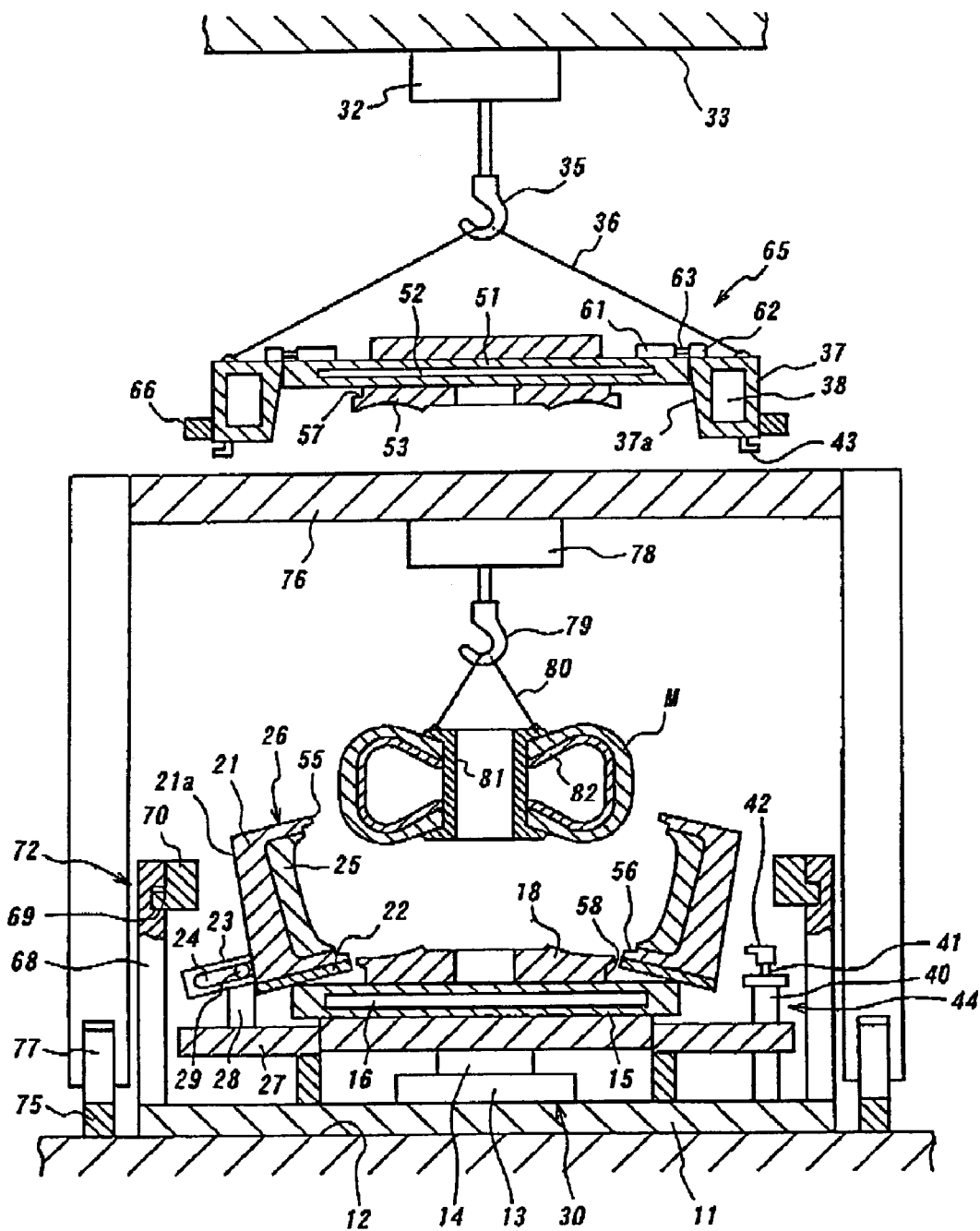
FIG. 1 is a schematic front sectional view showing an embodiment of the present invention.
Figure 2:
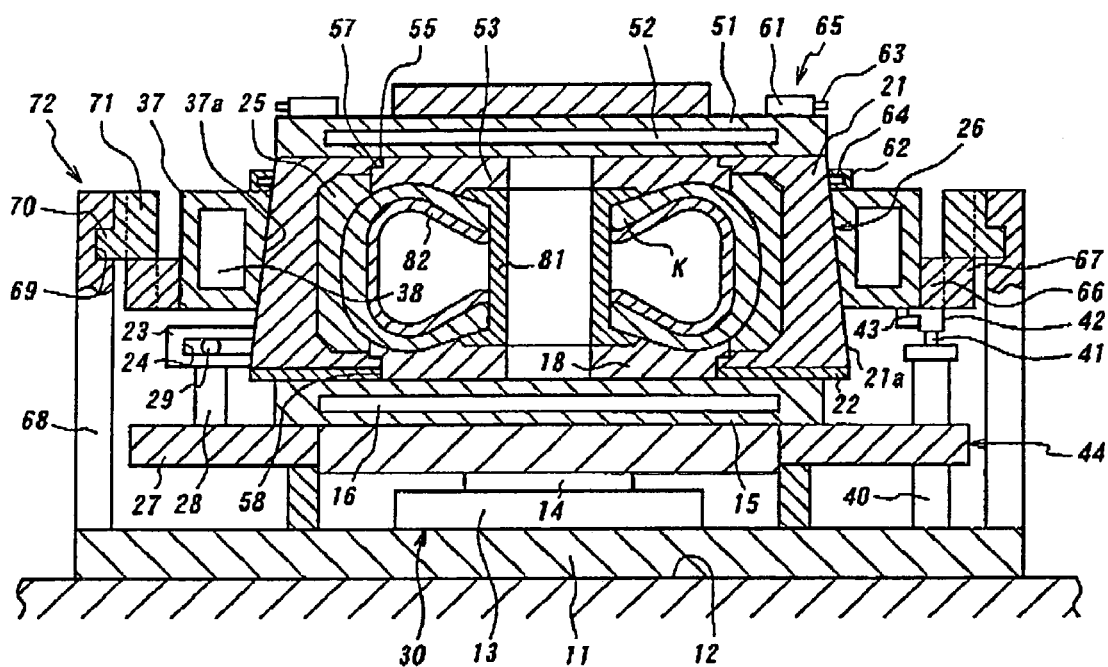
FIG. 2 is a front sectional view showing in the state right after the vulcanization.

In FIGS. 1 and 2, a planar base 11 is placed on a floor surface 12. An cylinder 13 as a vertically extending elevator mechanism is attached on a upper face of a central part of the base 11. A horizontal planar lower platen 15 is fixed at a tip (an upper end) of a piston rod 14 of the cylinder 13. A media chamber is formed in the lower platen 15. A vulcanizing media is supplied to the media chamber 16 at a high temperature and pressure when a large unvulcanized tire M for a construction vehicle is vulcanized. A lower mold member 18 on which the unvulcanized tire M is loaded when the unvulcanized tire M is carried in the sector mold member is fixed on the upper face of the lower platen 15. The lower mold member 18 shapes lower sidewall of the unvulcanized tire M mainly during the vulcanization. The lower platen 15 and lower mold member 18 are integrally moved up and down with the piston rod 14 pulled in and out by an action of the cylinder 13.

A plurality of arcuate sector segments 12 are aligned along the peripheral direction. The sector segments 21 are slidably engaged with the upper face of the lower platen 15 located radially outward of the lower segment 18 via slide plates 22 fixed on their lower faces, as well as are radially movably supported. A radially outward end of the lower platen 15 is engaged with radially center portions of the slide plates 22. An outer periphery 21a of the sector segment 21 has a inclined face inclined radially inwards as it goes upwardly.

Radially outwards extending projection members 23 are respectively fixed at lower ends of radially outward faces of the sector segments 21, and are respectively provided with ellipsoidal through slots 24 extending along the longitudinal direction (the radial direction) of the projection members 23. Arcuate mold bodies 25 shaping the tread of the unvulcanized tire M mainly during the vulcanization are respectively fixed at radially inwards of the sector segments 21. The sector segments 21 and the mold bodies 25 altogether compose a plurality of sector mold members 26 aligned along the peripheral direction. Upper and lower ends of inner peripheries of the sector mold members 26 protrude radially inwards as compared with center portions due to an influence of the above-mentioned rounded crown of the tread.

A circular supporting member 27 is placed on the upper face of the base 11. The supporting member 27 is placed to be concentric with the cylinder 13 and surround it from radially outward. A plurality of (the same number as the sector segments 21) horizontal supporting axes 29 extending in the tangential direction are supported on the upper face of the supporting member via blankets 28, and the supporting axes 29 are inserted in the through slots 24 of the projection member 23.

When the lower platen 15 is moved up by an action of the cylinder 13 while the sector mold members 26 locate at the radially outermost positions, each sector mold member 26 undergoes a pushing force directed upwardly from the lower platen 15 engaged with the sector mold member 26 at a radially inward of the supporting axis 29 (a swinging center of the sector mold member 26), and is radially swung from the upright state where the tire is to be vulcanized to the inclined state where the upper end is inclined radially outwards about the supporting axis 29. On the other hand, when the lower platen 15 is moved down by an action of the cylinder 13, the sector mold member 26 is radially swung from the inclined state to the upright state about the lower end (the supporting axis 29) by its own weight.

The above-mentioned cylinder 13, lower platen 15, protrude member 23, and supporting axis 29 altogether compose a swinging means 30 for swinging the sector mold members about the lower ends while the sector mold members 26 locate at the radially outermost positions. In this way, if the swinging means 30 is composed of the above-mentioned cylinder 13, lower platen 15, protrude member 23, and supporting axis 29, the sector mold members 26 are securely and readily swung with a simple configuration.

A crane 32 as a releasing means is attached on a coiling 33 directly above the lower mold member 18. A horizontal outer ring 37 hangs on a hook 35 of the crane 32 via wire rope 36. The crane 32 holds the outer ring 37 detached from the sector mold members 26 until the sector mold members 26 are radially displaced, or the tire is vulcanized. In this way, if the outer ring 37 is detached from the sector mold members 26 by crane 32 until the sector mold members 26 are radially displaced, or the tire is vulcanized, the outer ring 37 is usually detached from the sector mold members 26, so that a replacement work of the sector mold members 26 due to a change in a kind of tire is facilitated.

A media chamber 38 to which a vulcanizing media is supplied is formed in the outer ring 37, and an inner periphery 37a of the outer ring 37 is an inclined surface being capable of slidably contacting with the outer periphery 21a. One of the outer periphery 21a and the inner periphery 37a is provided with a not-shown dovetail having a T-shaped cross section, for example, and the other is provided with a dovetail groove in a complementary relation to the dovetail. When the outer ring 37 is fitted on the outside of the sector segment 21 at upright position, the dovetail is inserted in the dovetail groove to couple the sector segment 21 with outer ring 37. In this state, when the outer ring 37 is moved down, the plurality of sector mold members 26 are synchronously displaced radially inwards by a wedge effect of the inclined face.

A cylinder 40 as a vertically extending displacing mechanism is attached on the supporting member 27. A catching piece 42 is fixed at a tip of the piston rod 41 of the cylinder 40. On the other hand, a catching piece 43 being capable of catching and releasing the catching piece 42 is provided at the lower face of the outer ring 37. When the cylinder 40 is activated to pull out the piston rod 41 while the catching piece 42 catches the catching piece 43, the outer ring 37 is moved up. In this state, if the outer ring 37 is dovetail-coupled with the sector mold members 26, the plurality of the sector mold members 26 are synchronously displaced radially outwards. The outer ring 37, cylinder 40, and catching pieces 42 and 43 altogether compose a displacing means 44 synchronously displacing the plurality of sector mold members 26 radially.

An upper platen 51 has a planar shape similar to the lower platen 15. The upper platen 51 is provided with a media chamber 52 to which a vulcanizing media is supplied at a high temperature and high pressure when the unvulcanized tire M is vulcanized. An upper mold member 53 being a counterpart of the lower mold member 18 is fixed at the lower face of the upper platen 51. The upper mold member 53 is moved toward and away from the lower mold member 18 by a action of the crane 32, and shapes the upper sidewall of the unvulcanized tire M mainly during the vulcanization.

When the upper platen 51 is moved down until it contacts the upper surface of the sector mold member 26 at the upright position, the upper mold member 53 contacts the unvulcanized tire M loaded on the lower mold member 18. Thereafter, the outer ring 53 is moved down to synchronously displace the sector mold members 26 to the radially innermost position, and the lower mold member 18, sector mold members 26, and upper mold member 53 tightly contact each other to form a vulcanizing space for hermetically enclosing the unvulcanized tire M.

The upper and lower ends of the inner periphery of each of the sector mold members 26, and more specifically, the sector segments 21 are provided with arcuate projections 55 and 56, respectively, protruded radially inwards, while the upper end of the outer periphery of the upper mold member 53 and lower end of the outer periphery of the lower mold member 18 are provided annular concaves 57 and 58, respectively, being in a complementary relation to the arcuate projections 55 and 56. When the sector mold members 26 are synchronously displaced to the radially innermost position as mentioned above, the arcuate projection 55 and 56 are inserted in the annular concaves 57 and 58, respectively, so that the arcuate projection 55 and 56 accept a reaction force of an inner pressure to prevent the lower and upper mold members 18 and 53 from breaking apart from each other and opening during the vulcanization.

An arcuate concave may be formed on the inner periphery of the above-mentioned sector segment 21, and annular projections may be formed on the outer periphery of the lower and upper mold members 18 and 53. In this way, if the projections or the concaves are formed at upper and lower ends of the inner periphery of the sector mold member 26 while the concaves or the projections being in a complementary relation to the above-mentioned projections or concaves are formed on the outer periphery of the upper and lower mold members 53 and 18, and the projections are inserted in the concaves by displacing the sector mold members 26 to the radially innermost positions, the upper and lower mold members 53 and 18 are effectively prevented from opening during the vulcanization, thereby avoiding an overflow of the rubber between the sector mold members.

A plurality of cylinders 61 are fixed on the upper surface of the radially outer end of the upper platen 51 to be evenly spaced with each other along the peripheral direction while a plurality of (the same number as the cylinders 61) coupling blocks 62 are fixed to be evenly spaced with each other along the peripheral direction. When the piston rod 63 of the cylinder 61 is pulled out and is inserted in a insert hole 64 formed in the coupling block 62, the upper platen 51 is coupled with the outer ring 37 in the state where the upper face of the upper platen 51 locates on the same plane as the upper face of the outer ring 37 and the upper platen 51 is placed in the outer ring 37. The above-mentioned cylinder 61 and coupling blocks 62 altogether compose a coupling means 65 for coupling the upper platen 51 with the outer ring 37 in the state where the upper platen 51 is placed in the outer ring 37.

A bayonet ring 66 is fixed at the lower end of the outer periphery of the outer ring 37, and a plurality of arcuate tabs 67 evenly spaced along the peripheral direction are formed on the outer periphery of the bayonet ring 66. A cylindrical supporting frame 68 are fastened its lower end to the base 11 and surrounding the supporting member 27 from a radially outside. A radially outward portion of the bayonet ring 70 is inserted in an annular groove 69 formed at the upper end of the inner periphery of the supporting frame 68. A plurality of (the same number as the arcuate tabs 67) arcuate tabs 71 evenly spaced along the peripheral direction are formed on the inner periphery of the bayonet ring 70.

The outer ring 37 is moved down until the arcuate tabs 67 of the bayonet ring 66 pass through and exit from spaces between the arcuate tabs 71 of the bayonet ring 70, and then the bayonet ring 70 is rotated by a not shown rotating mechanism such as a cylinder to the position where the arcuate tabs 71 overlap above the arcuate tabs 67, so that the outer ring 37 is fastened on the supporting frame 68. The above-mentioned bayonet rings 66, 70 and cylinder altogether compose a fastening means 72 for fastening the outer ring 37 moved down to the lowermost position on the base 11, the supporting frame 68, that is a fixing section of the tire vulcanizing apparatus. In this embodiment, a bayonet is used as the fastening means 72, as mentioned above.

With providing such fastening means, a radially outward displacement of the sector mold members 26 during the vulcanization can be strongly prevented, thereby strongly suppressing an overflow of the rubber between the sector mold members 26 or the like. Moreover, a bayonet is used as the fastening means 72, a radially outward displacement of the sector mold members 26 during the vulcanization can be readily and securely prevented.

A pair of laterally extending guide rails 75 are laid on the floor surface 12 of the both sides of the base 11. Rollers 77 is rotatably supported at lower ends of a gate-shaped running flame 76 and contact the guide rails 75 in a rolling manner. A crane 78 is mounted on the center of the upper end of the running frame 76, and a vulcanizing rim 81 supporting either bead of the unvulcanized tire M from a radially inside is hanged on a hook 79 of the crane 78 via a wire rope 80.

Either ends of a bladder 82 which is toroidally inflated in the unvulcanized tire M when the vulcanizing media is supplied to the inside are attached to the vulcanizing rim 81. The running frame 76 is run along the guide rails 75 by an action of a not shown motor, cylinder, or the like in the state where it hangs the unvulcanized tire M or the vulcanized tire K, and carries in and out the unvulcanized tire M or the vulcanized tire K.

In the next, operations of an embodiment according to the present invention will be described. Suppose that the running frame 76 hangs the vulcanizing rim 81 on which the unvulcanized tire M is applied and is run along the guide rails 75 by an action of a motor or the like to carry the unvulcanized tire M to directly underneath of the lower mold member 18. In this state, since the piston rod 14 of the cylinder 13 is pulled out to elevate the lower platen 15, the sector mold members 26 located at the radially outermost position is upwardly applied with a pushing force from the lower platen 15, is swung to the inclined state about its lower end (the supporting axis 29), and is opened with its diameter expanding upwardly. In this state, the outer ring 37, the upper platen 51, and the upper mold member 53 having been coupled with each other by the coupling means 65 are on standby at the directly overhead of the lower mold member 18 in the state where they are hanged on the hook 35 of the crane 32.

When the vulcanizing rim 81 and the unvulcanized tire M are moved down by an action of the crane 78 to transfer and laterally load the unvulcanized tire M on the lower mold member 18, the wire rope 80 is detached from the vulcanizing rim 81. Thereafter, the hook 79 is moved up, and the running frame 76 is run along the guide rails 75 to evacuate from the lower mold member 18. The crane 32 is, then, operated to integrally move down the outer ring 37, the upper platen 51, and the upper mold member 53, so that the upper mold member 53 approaches the lower mold member 18.

In this state, the piston rod 14 of the cylinder 13 is pulled in, and the lower platen 15, the lower mold member 18, and the unvulcanized tire M are integrally moved down, so that the sector mold members 26 are radially swung from the inclined state to the upright state about the lower end (the supporting axis 29) due to their own weight. In this regard, as the sector mold members 26 are only swung but not radially displaced, they still locate at the radially outermost position.

Subsequently, when the outer ring 37, the upper platen 51, and the upper mold member 53 are moved down until the lower surface of the upper platen 51 contacts the upper surface of the sector mold member 26, the outer ring 37 is engaged with the radially outsides of the sector mold members 26, and is dovetail-coupled with the sector mold members 26, as well as the upper mold member 53 contacts the upper side wall of the unvulcanized tire M loaded on the lower mold member 18. The wire rope 36 is, then, detached from the outer ring 37, and the hook 35 is moved up to the initial position.

Thereafter, the piston rod 41 of the cylinder 40 is pulled out to elevate the catching piece 42, and the catching piece 42 catches the catching piece 43 of the outer ring 37. The piston rod 63 of the cylinder 61 is, then, pulled in to draw out the piston rod 63 from the insert hole 64 of the coupling block 62, so that the coupling between the outer ring 37 and the upper platen 51 is released. The piston rod 41 is pulled in by an action of the cylinder 40 to move down the outer ring 37. In this state, due to a wedge effect of the outer and inner periphery 21a and 37a, a plurality of the sector mold members 26 are synchronously displaced radially inwards. In this state, the arcuate tabs 67 of the bayonet ring 66 are moved down while passing through spaces between the arcuate tabs 71 of the bayonet ring 70.

When the outer ring 37 is moved down to the lower most position, each of the sector mold members 26 is moved to the radially innermost position, so that the lower mold member 18, the sector mold member 26, and the upper mold member 53 are closely contact each other. Owing to this, the unvulcanized tire M is hermetically enclosed in the vulcanizing space formed be the lower mold member 18, the sector mold members 26, and the upper mold member 53. In this state, the arcuate projections 55 and 56 are inserted in the annular concaves 57 and 58, respectively, and the lower and upper mold members 18 and 53 are restrained by the sector mold members 26.

The arcuate tabs 67 also pass through and exit from spaces between the arcuate tabs 71. In this state, the bayonet ring 70 is rotated to the position where the arcuate tabs 71 overlap above the arcuate tabs 67, so that the outer ring 37 is fastened on the supporting frame 68. In this state, the vulcanizing media is supplied into the media chambers 16, 38, and 52 and the bladder 82 at a high temperature and pressure, and the unvulcanized tire M is vulcanized with the lower mold member 18, the sector mold member 26, and the upper mold member 53 to give the vulcanized tire K.

When the vulcanizing operation is finished in this way, the bayonet ring 70 is rotated to the position where the arcuate tabs 71 locate between the arcuate tabs 67 to release the outer ring 37 from the supporting frame 68. The piston rod 41 of the cylinder 40 is pulled out to elevate the outer ring 37. In this state, the sector mold members 26 are synchronously displaced to the radially outermost position due to the dovetail-coupling with the outer ring, so that the arcuate projections 55 and 56 are drawn out from the annular concaves 57 and 58, respectively, and the lower and upper mold members 18 and 53 are released from the restriction of the sector mold members 26.

When the outer ring 37 is moved up until the upper surface of the outer ring 37 and the upper surface of the upper platen 51 are on the same plane, the piston rod 63 of the cylinder 61 is pulled out to insert in the insert hole 64, so that the outer ring 37 and the upper platen 51 are coupled. The catching piece 42 is, then, departed from the catching piece 43, and the catching piece 42 is moved down to the initial position by an action of the cylinder 40.

The hook 35 of the crane 32 is moved down, the wire rope 36 is connected to the outer ring 37, and, then, the hook 35 is moved up, so that the upper mold member 53 is spaced from the lower mold member 18, as well as the outer ring 37, the upper platen 51, and the upper mold member 53 are returned to the initial positions. By so doing, the dovetail-coupling between the outer ring 37 and the sector mold members 26 is released. The piston rod 14 of the cylinder 13 is pulled out to elevate the lower platen, the sector mold members 26 located at the radially outermost position is upwardly applied with a pushing force from the lower platen 15, is swung from the upright state to the inclined state about its lower end (the supporting axis 29), and is opened with its diameter expanding upwardly.

The running frame 76 is run to move the hook 79 to the directly overhead of the vulcanized tire K, and, then, the hook 79 of the crane 78 is moved down. The wire rope 80 is connected to the vulcanizing rim 81, and, then, the hook 79 is moved up to hang the vulcanizing rim 81 and the vulcanized tire K, as well as the running frame 76 is run to transfer the vulcanizing rim 81 and the vulcanized tire K to the next process.

Although the upper and lower ends of the inner periphery of the sector mold member 26 protrude radially inwards as compared with the center, as mentioned in the above, the sector mold members 26 are swung so as the upper end to move radially outwards about the lower end and are inclined so as the upper end to open upwardly when the unvulcanized tire M is carried in, or when the vulcanized tire K is carried out, according to this embodiment. Thus, even if the radially inward distance of the sector mold members 26 moved by the displacing means 44 is small, the unvulcanized tire M or the vulcanized tire K can be easily carried in/out the sector mold member while avoiding the tire from interfering with the protruded upper end of the inner periphery of the sector mold member 26. Owing to this, the entire apparatus can be smaller in size and lower in cost.

In the above-mentioned embodiment, the sector mold members 26 and the outer ring 37 are to be dovetail-coupled, but, according to the present invention, the sector mold members 26 and the outer ring 37 may be merely slidably contacted while springs may be provided to continuously push the sector mold members 26 radially outwards. In this case, the sector mold members 26 arc radially inwards displaced as the outer ring 37 is moved down, while the sector mold members 26 are radially outwards displaced by a pushing force of the springs as the outer ring 37 is moved up.

In the above-mentioned embodiment, the upper platen 51 and the outer ring 37 are coupled by means of the cylinder 61 and the coupling block 62, but, according to the present invention, they may be coupled by the bayonet or the like. Further, in the above-mentioned embodiment, although the sector segments 21 of the sector mold members 26 are provided with the arcuate projections 55 and 56, according to the present invention, the mold body 25 of the sector mold members 26 may be provided with a projection or a concave.

In the above-mentioned embodiment, description is made on the case where a large pneumatic tire for a construction vehicle is vulcanized. The present invention, however, can be applied to a pneumatic tire for truck/bus or passenger vehicle. In this case, instead of using the large crane 32, 78, and running frame 76, a well known carrying apparatus can be used to transfer the tire, the upper platen or the like. Further, according to the present invention, when the sector mold members 26 are swung to the upright or the inclined states, the swinging force may be applied from the outer ring 37 to the sector mold members 26 in conjunction with an action of the cylinder 13.

Having been described in the above, according to the present invention, a method and apparatus for vulcanizing a tire can be smaller and cheaper.

While the preferred embodiments of the present invention have been described, it is to be understood that modifications and variations may be made without departing from the scope of the invention as defined by the appended claims.

What is claimed is:

1. A method for vulcanizing a tire, comprising:
   transferring and loading an unvulcanized tire onto a lower mold member when a plurality of arcuate sector mold members aligned along the peripheral direction locate at the radially outermost positions as well as upper ends of the sector mold members incline radially outwards about their lower ends;
   moving an upper mold member toward a lower mold member while swinging the sector mold members about their lower ends to straightly stand the sector mold members, and then synchronously displacing the sector mold members radially inwards, so that the unvulcanized tire is hermetically enclosed in a mold space formed by the lower mold member, the upper mold member and the sector mold members;
   vulcanizing the unvulcanized tire with the upper mold member, the lower mold member, and the sector mold members to give a vulcanized tire;
   synchronously displacing the sector mold members radially outwards, and then swinging the sector mold members such that the upper ends incline radially outwards about the lower ends while moving the upper mold member away from the lower mold member; and
   carrying the vulcanized tire out of the mold.

2. The method according to claim 1, wherein a platen is moved upwardly to swing the sector mold members such that the upper ends incline radially and is moved downwardly to swing the sector mold members about their lower ends to straightenly stand the sector mold members.

3. The method according to claim 1, wherein slidable contact between the upper mold member and the sector mold members displace the sector mold member radially inward as the upper mold member moves toward the lower mold member.

4. The method according to claim 3, wherein slidable contact between the upper mold member and the sector mold members displace the sector mold members radially outward as the upper mold member moves away from the lower mold member.

5. The method according to claim 3, wherein a spring pushes each of sector mold members radially outward so as to displace the sector mold members radially outward as the upper mold member moves away from the lower mold member.

6. An apparatus for vulcanizing a tire, comprising: a lower mold member for loading a transferred unvulcanized tire; an upper mold member being capable of moving toward/away from the lower mold member; a plurality of arcuate sector mold members aligned along the peripheral direction and being swingable about the lower ends; means for synchronously displacing the sector mold members radially in the radial direction to and from radially outermost positions; and means for swinging the sector mold members about the lower ends when these sector mold members locate at the radially outermost positions, wherein:
   the upper mold member is movable toward the lower mold member while the sector mold members in an upright state are synchronously movable radially inwards by the displacing means so that the unvulcanized tire is hermetically enclosed in a mold space formed by these molds, and is vulcanized to give a vulcanized tire,
   the sector mold members are synchronously movable radially outwards by the displacing means, and are swingable by the swinging means such that the upper ends incline radially outwards about the lower ends, and
   the upper mold member is movable away from the lower mold member, so as to allow removal of the vulcanized tire out of the mold.

7. The apparatus according to claim 6, wherein said displacing means is composed of an outer ring having an inclined face at its inner periphery and a displacing mechanism for displacing the sector mold members radially inwards by lowering the outer ring, said inclined face contacting outer peripheries of the sector mold members, and the apparatus further comprises means for fastening the outer ring having been lowered to the lowermost position on a fixing section of the apparatus for vulcanizing a tire.

8. The apparatus according to claim 7, wherein a bayonet is used as said fastening means.

9. The apparatus according to claim 8, wherein the apparatus further comprises means for releasing said outer ring from the sector mold members, and the outer ring is detachable from the sector mold members unless the sector mold members are radially displaced or the tire is vulcanized.

10. The apparatus according to claim 7, wherein the apparatus further comprises means for releasing said outer ring from the sector mold members, and the outer ring is detachable from the sector mold members unless the sector mold members are radially displaced or the tire is vulcanized.

11. The apparatus according to claim 6, wherein said swinging means is composed of a lower platen and an elevator mechanism for moving the lower platen upwardly and downwardly, said lower platen is attached by the lower mold member and capable of engaging with a portion radially inward to the swinging center of the sector mold members located at radially outermost positions.

12. The apparatus according to claim 6, wherein a projection or depression is formed at each of the upper end and the lower end of the inner periphery of the sector mold, a projection or a depression in a complement relation with said projection or depression is formed on the outer periphery of the upper and lower mold members, and the sector mold members are displaced to the radially innermost position to insert the projection in the depression, thereby preventing the upper and lower mold members from opening.

13. An apparatus for vulcanizing a tire, comprising: a lower mold member for loading a transferred unvulcanized tire; an upper mold member being capable of moving toward/away from the lower mold member; and a plurality of arcuate sector mold members aligned along the peripheral direction and being swingable at radially outermost positions such that the upper ends of the sector mold members incline radially outwards about the lower ends, wherein:

- the upper mold member is movable toward the lower mold member while the sector mold members in an upright state are synchronously movable radially inwards by slidable contact between the upper mold member and the sector mold members, so that the unvulcanized tire is hermetically enclosed in a mold space formed by these molds, and is vulcanized to give a vulcanized tire, and
- the upper mold member is movable away from the lower mold member while the sector mold members in an upright state are synchronously movable radially outwards to said radially outermost positions, so as to allow removal of the vulcanized tire out of the mold.

14. The apparatus according to claim 13, wherein said lower mold member comprises a platen that is movable upwardly to swing the sector mold members at said radially outermost position, such that the upper ends incline radially, and is movable downwardly to swing the sector mold members about their lower ends to straightenly stand the sector mold members.

* * * * *